US011252941B2

(12) United States Patent
Soder et al.

(10) Patent No.: US 11,252,941 B2
(45) Date of Patent: Feb. 22, 2022

(54) ANIMAL BEHAVIOR MONITOR

(71) Applicant: The United States of America, as represented by the Secretary of Agriculture, Washington, DC (US)

(72) Inventors: Kathy J. Soder, Petersburg, PA (US); Kyle R. Elkin, State College, PA (US); Sandra L. Dillard, Calhoun, GA (US); Dennis R. Bookhamer, Huntingdon, PA (US); Melissa D. Rubano, Petersburg, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 285 days.

(21) Appl. No.: 15/884,524

(22) Filed: Jan. 31, 2018

(65) Prior Publication Data
US 2019/0230905 A1    Aug. 1, 2019

(51) Int. Cl.
| *A01K 29/00* | (2006.01) |
| *A01K 27/00* | (2006.01) |
| *G06K 9/00* | (2022.01) |
| *B68B 1/02* | (2006.01) |
| *A01K 11/00* | (2006.01) |
| *A01K 15/02* | (2006.01) |

(52) U.S. Cl.
CPC .......... *A01K 29/005* (2013.01); *A01K 11/008* (2013.01); *A01K 15/028* (2013.01); *A01K 27/001* (2013.01); *A01K 27/009* (2013.01); *B68B 1/02* (2013.01); *G06K 9/00362* (2013.01)

(58) Field of Classification Search
CPC .... A01K 15/00; A01K 15/021; A01K 15/028; A01K 27/009; A01K 29/005
USPC .................................................. 119/719, 859
See application file for complete search history.

(56) References Cited

U.S. PATENT DOCUMENTS

| 6,115,679 | A | * | 9/2000 | Rutter | A01K 29/005 119/421 |
| 7,350,481 | B2 | * | 4/2008 | Bar-Shalom | A01K 29/005 119/859 |
| 10,098,328 | B2 | * | 10/2018 | van Dijk | G16H 40/67 |
| 2010/0222711 | A1 | * | 9/2010 | Lajeunesse | A61B 5/1116 600/595 |
| 2012/0238908 | A1 | * | 9/2012 | Osako | A61B 7/006 600/586 |
| 2013/0157218 | A1 | * | 6/2013 | Brunner | A61C 19/045 433/69 |
| 2014/0123912 | A1 | * | 5/2014 | Menkes | A61B 5/1105 119/859 |
| 2017/0231199 | A1 | * | 8/2017 | van Dijk | G16H 40/67 340/573.1 |

(Continued)

FOREIGN PATENT DOCUMENTS

| JP | 11-318862 | * | 11/1999 |
| JP | 2005-251138 | * | 9/2005 |

*Primary Examiner* — David J Parsley
(74) *Attorney, Agent, or Firm* — John Fado; Robert D. Jones

(57) ABSTRACT

A system for monitoring ruminant animal foraging that utilizes a piezoelectric film sensor in communication with a computer processor to record and characterize jaw movement data for the foraging ruminant animal. The processor applies pattern algorithms to categorize the jaw movement data so that the jaw movements are categorized as at least chewing, biting, ruminating, and/or idling.

12 Claims, 5 Drawing Sheets

(56) References Cited

U.S. PATENT DOCUMENTS

2017/0303828 A1* 10/2017 Seki .................... A61B 5/7214
2018/0353122 A1* 12/2018 Predovich ............ A61B 5/6815

* cited by examiner

ANIMAL BEHAVIOR MONITOR

FIELD OF THE INVENTION

The disclosed system relates to monitoring multiple aspects of ruminant animal behavior. Specifically, the system monitors jaw movements, grazing location and other characteristics in ruminant animal foraging behavior—and communicates the monitored behavior to a livestock manager.

BACKGROUND OF THE INVENTION

Foraging behavior in grazing ruminant animals is a complex process that is difficult to quantify. A greater understanding of foraging behavior is needed to better evaluate (among other things) plant-herbivore interactions in pasture-based systems. Direct observation of grazing animals is tedious, error-prone, and subject to natural limitations—such as weather conditions and the number of animals that can be effectively observed at one time. Additionally, human presence alone may significantly alter the foraging behavior of some animals.

Although some prior art ruminant behavior monitors are available, the monitors are cumbersome and fragile and are frequently damaged or dismantled by other cows, or affected by wet weather. Prior art monitors lack a Global Positioning System (GPS) capability and do not have a remote user interface, so that animals wearing the system must be physically located and detained to access the monitor's data.

The need exists for an animal monitoring system that affords the user the ability to collect and analyze data associated with various aspects of animal foraging behavior as well as information regarding the animal's spatiotemporal pasture location with little user intervention or disruption of the animal's natural foraging behavior. The monitoring system disclosed herein comprises a halter-mounted system that includes dual piezoelectric jaw movement sensors to track the ruminant's actual jaw movements.

The monitoring system also includes a data processor, data logger-type electronic storage capability, and a radio transceiver with GPS capability. The monitoring system further continuously (or selectively) communicates the status of the monitoring apparatus (wirelessly) back to a host computer. The system is configured so that a host computer can download the collected data on demand.

SUMMARY OF THE INVENTION

This disclosure is directed to a system for monitoring ruminant foraging behavior. The system utilizes a piezoelectric film sensor in communication with a computer processor to record and categorize jaw movement data for the ruminant. The system measures jaw movements and communicates the jaw movements to the processor. The processor applies pattern algorithms to categorize the jaw movement data so that the jaw movements are categorized as, at a minimum, chewing, biting, ruminating, and/or idling.

DETAILED DESCRIPTION OF PREFERRED EMBODIMENTS

Figure 1:
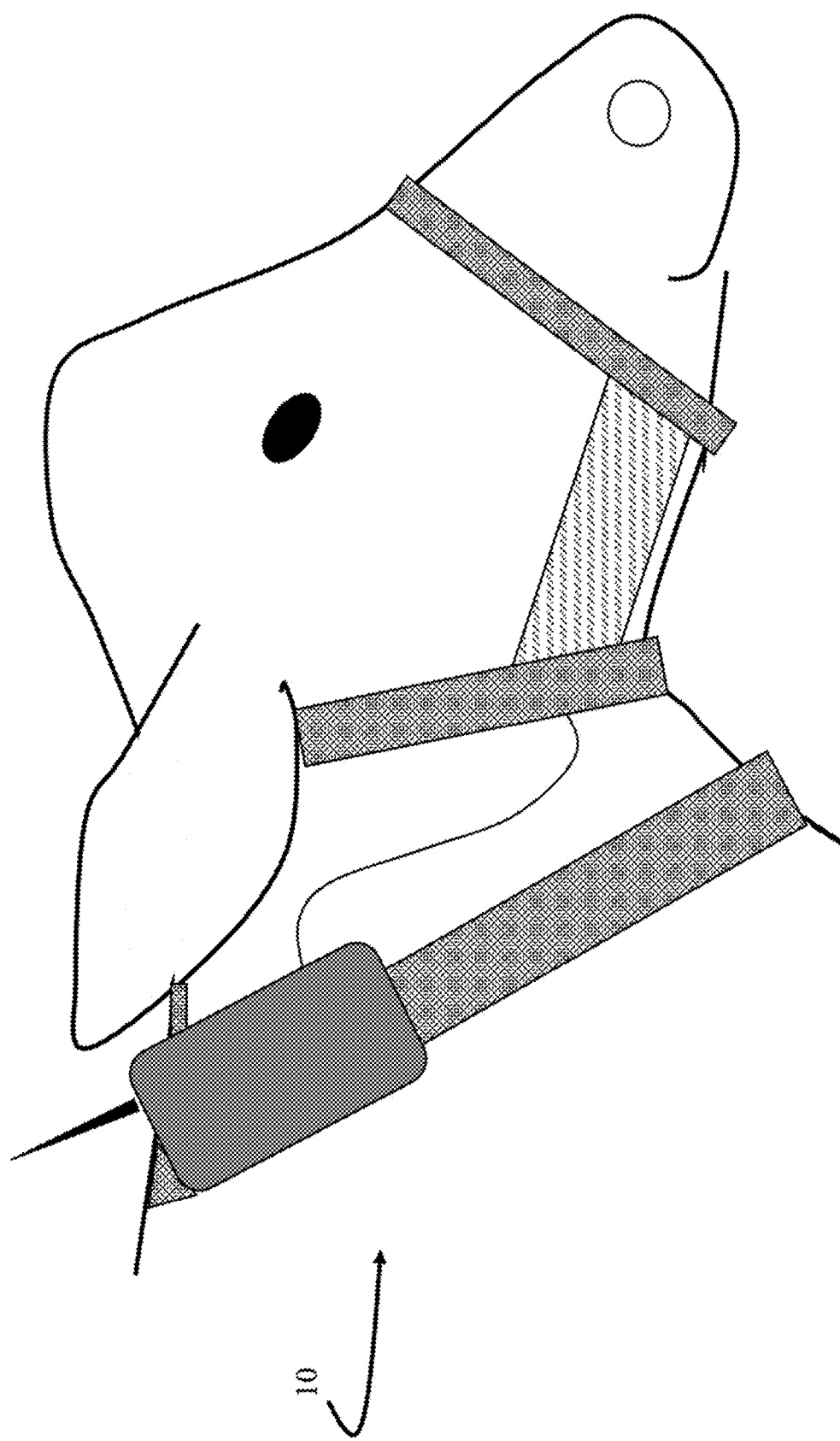
FIG. 1 is a line drawing of the monitoring system as it is worn by a ruminant animal (a cow).
Figure 2:
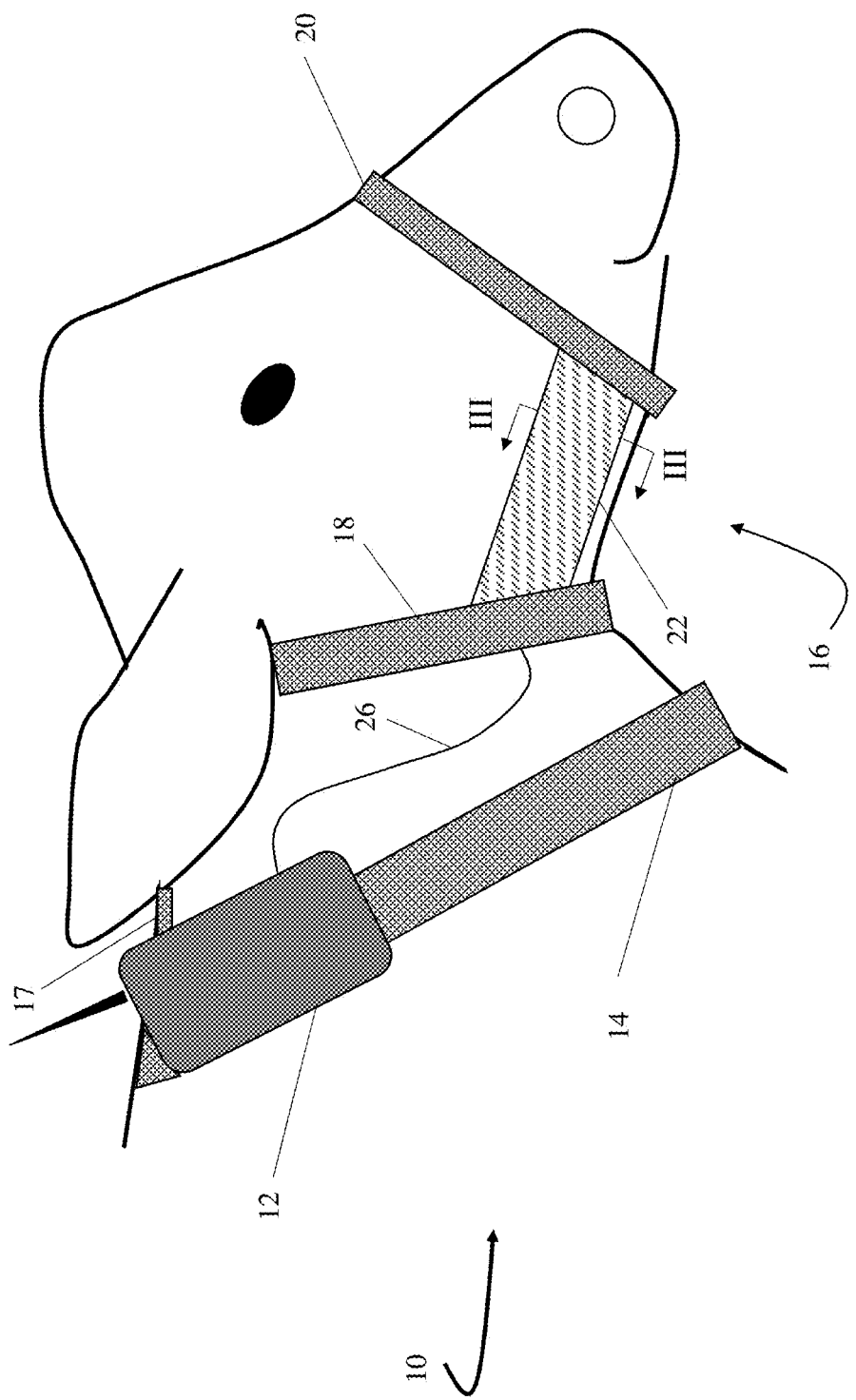
FIG. 2 is a schematic profile view of the system.
Figure 3:
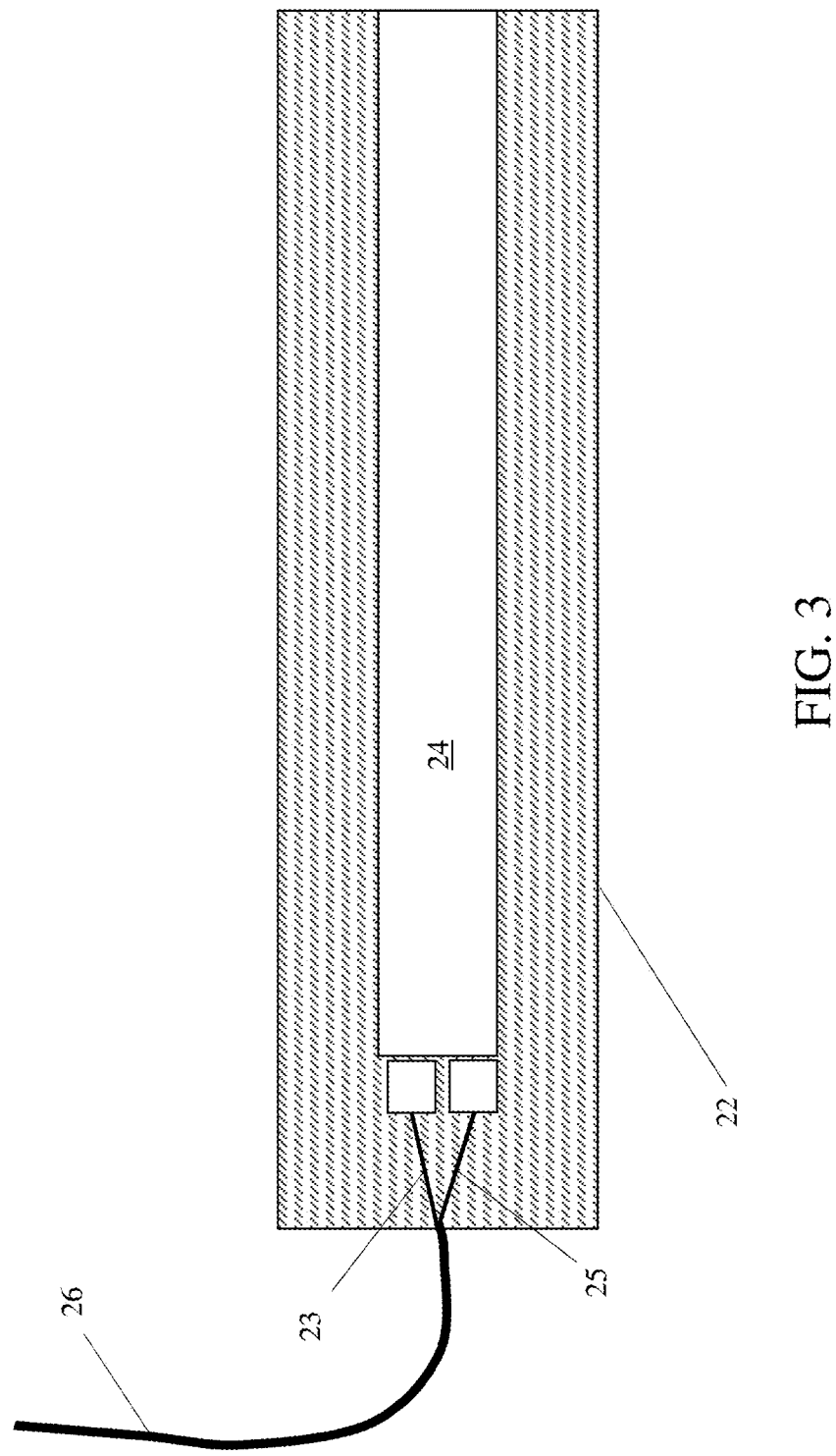
FIG. 3 is a schematic view of the sensor pouch (shown in FIG. 2 as reference number 22) with the outer layer of the pouch removed so that the piezoelectric film-type sensor (reference 24) inside the pouch is visible.

As generally shown in FIGS. 1 and 2, the monitoring system of the current invention 10 comprises a portable electronics module 12, and a retaining collar 14, as well as a data-gathering halter 16. The data-gathering halter 16 comprises nylon supporting straps 18, 20 and an elastic sensor pouch 22 positioned adjacent to the ruminant animal's jaw muscles (i.e. buccinators). The halter 16 may also comprise a detachable strap 17 connecting the halter 16 to the collar 14. The sensor pouch 22 (as shown in FIG. 2) is present on both sides of the ruminant's head. As best shown in FIG. 3, the nylon pouch 22 includes a film-type piezoelectric sensor 24 that translates the movement of the ruminant's jaws into an analog signal, which is communicated to the portable electronics module 12.

Figure 4:
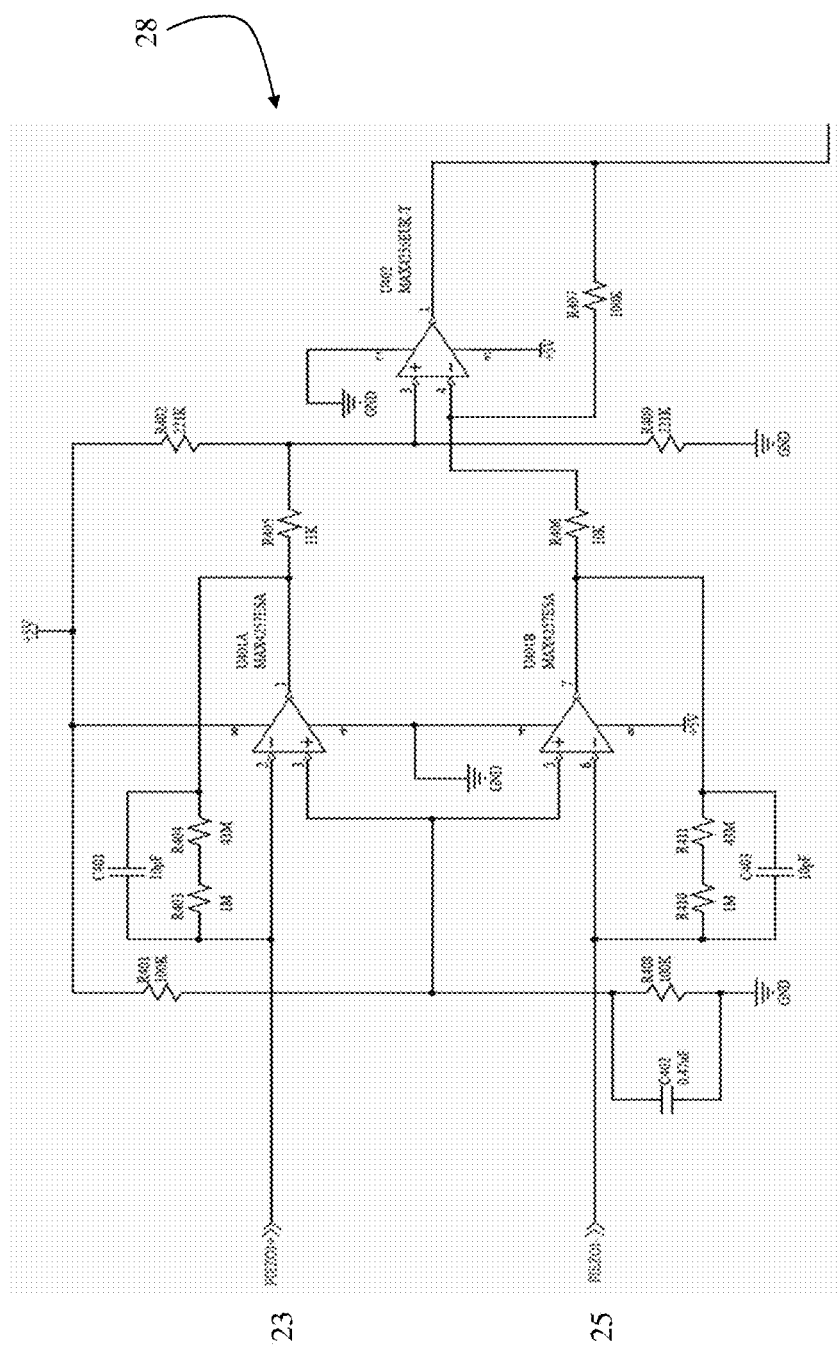
FIG. 4 is an electrical schematic of the differential amplifier circuit.

The analog signal is communicated via two signal wires 23, 25 that are bound into a connecting cord 26. For clarity, the connecting cord 26 is shown as exposed on the animal's neck, however, the cord 26 may be at least partially hidden under the nylon halter straps 18, 20. Preferably, all the wiring is routed through the halter straps 17, 18, 20 to prevent damage to wiring from rubbing by the experimental animal or from curious herdmates so that the wired connection 26 connects to the portable electronics module 12 right behind the animal's head. Upon reaching the electronics module 12, the connecting cord 26 is separated (back) into two leads 23, 25. As shown in FIG. 4, the leads 23, 25 are then fed into the differential amplifier circuit 28.

Figure 5:
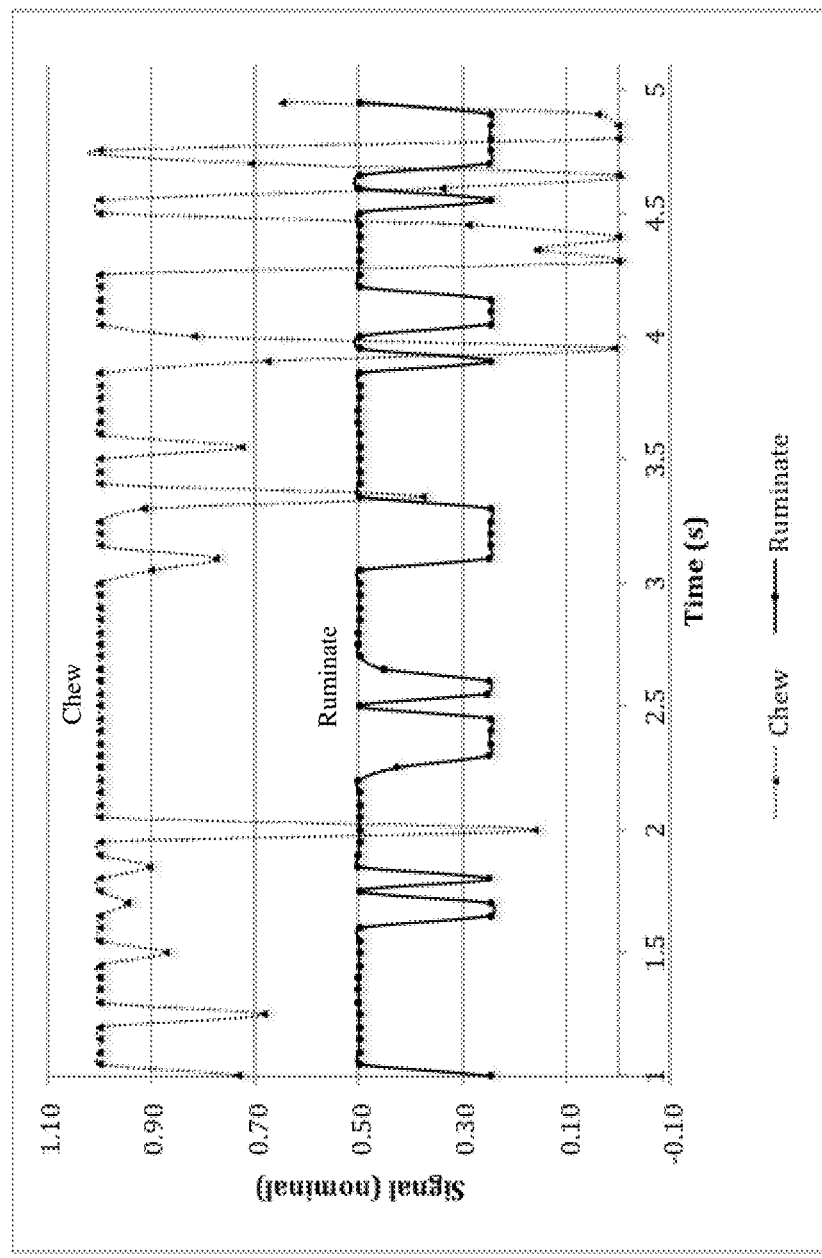
FIG. 5 is a graph showing the jaw movements of the target ruminant animal (a cow) in Example 1.

The piezoelectric sensor 24 signal is proportional to both the direction and magnitude of the buccinators' movement so that, as the buccinators move, the sensor 24 "flexes". The sensor's flexing movement produces a specific electrical voltage (amplitude) and frequency pattern. The electrical pattern can be expressed as a pattern algorithm and compared to a data base of electrical patterns that correspond with known jaw movements—such as grazing bites and chews. FIG. 5 shows an example of the pattern algorithm data used to characterize jaw movement patterns associated with chewing and ruminating.

For the purposes of this disclosure, the term "pattern detection algorithm data" comprises an electrical signal pattern that has been shown to correspond with a certain type of behavior. For example, as applicable to the feeding behavior of a ruminant, pattern detection algorithm data can be used to identify chewing behavior; different pattern algorithm data can be used to identify ruminating behavior, etc.

Jaw movements such as grazing bites and chews can be used to assess grazing behavior and also provide a rough estimate of forage intake, which is otherwise impractical to obtain by conventional means. In addition, the sensors can be used to detect health issues in the ruminant. For example, reduced grazing and/or ruminating time may indicate that an animal is suffering from an illness or is in general poor health. Specifically, reduced rumination time can indicate that the animal is suffering from ruminal acidosis or other related ailments.

In the preferred embodiment, the piezoelectric film 24 comprises two DT4-052K/L piezoelectric sensors (52 μm film thickness, 22×171 mm electrodes; TE Connectivity, Schaffhausen, Switzerland). The piezoelectric film 24 is connected to the portable electronics module 12 through a 10 pin locking style plug and receptacle connector (Switchcraft Connxall, Chicago, Ill.).

When the monitoring system 10 is activated, a u-Blox PAM-7Q GPS module (u-Blox America Inc., Reston, Va.) sends a start pulse that initiates monitoring and recording of the animal's jaw movements via the piezoelectric sensors 24. In addition to the recording of the jaw movement, other data such as time, barometric pressure, temperature, and location (within two meters) are also recorded. As noted above and as shown in FIG. 4, the piezoelectric sensors 24 convert kinetic energy to an analog signal, and are used in tandem to generate specific electronic signatures (frequency and amplitude) based on the animal's jaw movements. The differential amplifier circuit shown in FIG. 4 is used to filter and magnify the piezoelectric output which is then recorded via a 12 bit analog to digital converter. A monitor circuit logs the digitally converted piezoelectric signals to a 2 GB flash memory card (SanDisk, Milpitas, Calif.) at a rate of 20 Hz.

An XBee Pro S1 transceiver (Digi International, Minnetonka, Minn.) is used for receiving commands, transmitting system errors and transmitting raw data for real-time remote monitoring directly from the animal. A host computer can connect to a mesh network of over 100 radios at a time, or transmit and receive information from each radio individually. Single or multiple radios can be polled simultaneously to send operating status updates, which include the current time, barometric pressure, temperature of the enclosure, and about 1 second of current data.

The 60 mW radio is capable of transmitting signals approximately 1.5 km (radio frequency line-of-sight), enabling the user to move independently of the animals and maintain a distance that does not interfere with the animal's natural foraging behavior. In addition to the instrument status packet, the unit can also send a 10 KB (kilobyte) data chunk (approximately 4 minutes) of the most recently collected data to the user for immediate analysis upon the user's request. The data is stored on the system as compressed binary and decrypted on the computer.

Once the computer receives the data, via either telemetry or direct download, an in-house LabVIEW program (National Instruments, Austin, Tex.) processes the data. The data is decrypted from compressed binary to ascii, in a .csv format. A second LabVIEW routine running concurrently analyzes the data by applying pattern algorithms used to differentiate the jaw movement signals into different classes (chewing, biting, ruminating, idling). Once the routine has completed its analysis of the data, a summary report is generated to determine several different statistics such as: number of bites/day; number of chews/day; overall time spent ruminating, grazing, or idling (minutes/day); specific time of day spent in these activities (ruminating, grazing, idling), total bites+chews; and average number of bites/minute, in an ascii format.

In addition to data logging, other sensors (such as the temperature and barometric pressure sensors) are used to monitor the health of the system. Predefined limits within the software are checked every second while the recorder is active. If the measured value is outside of the preset range, the transceiver will activate and send a warning signal to the host computer until the message is received and reset. A built-in watchdog timer also allows the CPU to monitor the data collection. The module can send a distress signal if there is a malfunction with the recorder so corrections can be made without losing large amounts of data. If there is no new data logged for longer than 5 seconds, the same type of warning message will be transmitted as above. Both of these warnings flags are programmed to notify the host until they are either reset or the battery dies.

The portable electronics module 12 also contains a graphical user interface (via circuitry well-known in the electronic art), which allows a user to remotely download the collected data onto a host computer (which may comprise a smartphone) without disturbing the animals. Any device capable of driving a USB serial port connection (i.e., tablet or laptop) can be used to communicate with the unit.

The enclosure portion of the portable electronics module 12 is made from a (16.2×6.7×5.2 cm), 2-piece hinged polycarbonate plastic box (Pelican 1030, Pelican Products, Torrance, Calif.) that includes a butylene rubber seal and a snapping-style lock. With the lock secured, the enclosure is completely waterproof. To prevent the buildup of pressure, the enclosure is manufactured with a hydrophobic Teflon (PTFE) purge membrane. All electronics charging, piezoelectric sensors, and CPU communication occur through a silicone sealed bulkhead-style 10-pin connector to limit moisture ingress. The portable electronics enclosure 12 is mounted onto the nylon livestock collar/belt 14 using Velcro and cable ties. The collar 14 is connected to the halter 16 through a D style clamp and a sewn nylon strap 17 at the poll of the animal's head. The 2-piece design allows the portable electronics enclosure 12 to be removed (for direct download, maintenance, or replacement) without disturbing the halter 16.

The portable electronics module enclosure 12 contains a 5V (5000 mAh) lithium ion battery as well as charge and discharge lines between the battery and the circuit board. With the current battery and electronics configuration, the monitoring system 10 can collect grazing behavior, location data, and actively communicate monitoring data for up to 24 hours. Without GPS and telemetry continuously active, the monitor can collect grazing data for up to 72 hours. The inventors anticipate that further changes to the power source and selective mode of operation may further extend the effective monitoring period.

In operation, the piezoelectric sensors 24 in the elastic pouch 22 measure frequency and amplitude of jaw movements. This data can be used to determine bite rate, number and length of meals, ruminating time and resting time. As noted above, the portable electronics module 12 comprises a GPS that can pinpoint location of a ruminant to monitor the animal's movements throughout a pasture or rangeland. The location of the animal can be important in determining whether the animal is grazing in fragile environments (e.g., riparian areas) or other areas of interest/concern.

Further, unlike confined animals where feed intake can be directly measured, quantifying intake and behavior of grazing ruminants is challenging due to the extensive nature of pasture-based systems. The location of the animal can also be a useful tool in estimating the animal's diet selection by combining grazing location and behavior with known patches of various forages in a biodiverse pasture—as well as the basic function of quantifying the amount of the animal's forage intake.

Examples

Two separate experiments were conducted to test both the accuracy of the recorder's measurements as well as the equipment functionality. Experiment/Example 1 was conducted on a lactating Holstein-Friesian cow housed in a tie stall barn at the Pennsylvania State University's Dairy Research Farm in accordance with the Pennsylvania State University Animal Care and Use guidelines (IACUC #46439). The data recorded on the behavior monitor was matched to video observations using a tripod-mounted Sony PXW-X70 XD video camera at a speed of 30 frames per second and positioned approximately 3 m from the cow. The video timing was synchronized with the GPS clock on the monitor to ensure that the camera and recorder clocks could be matched. The eating, ruminating and idling behavior of the animal was recorded for a total of 2 hours while in the tie stall. Once the equipment was mounted, the animal was not disturbed until the end of the 2 hour period. The first 15 minutes of data was not used to allow the cow to return to normal behavior after being disrupted for monitor installation.

Experiment/Example 2 was conducted at the University of New Hampshire's Organic Dairy Research Farm under UNH's IACUC protocol (#160908). The behavior monitor (described herein) was placed on a lactating Jersey cow after morning milking and prior to being turned out on pasture (at approximately 0800 hours). The cow, along with its herdmates, remained on pasture with the active on until brought back to the parlor for afternoon milking at 1600 hours.

In both experiments, the monitoring system was removed and examined. Overall, the monitors performed as expected and did not appear to influence feeding or foraging behavior of the animals after they became accustomed to wearing the halter—as evidenced by video observations in the tie stall barn and remote visual observations while on pasture. Prior habituation to wearing the monitor will be necessary for the test animals to be accustomed to the halter as well as for herdmate interference with the test animal's behavior while satisfying their initial curiosity over such a novelty being introduced to their environment.

The compressed binary file allowed data to be stored on the SD card at a rate of approximately 10 KB/min, which was verified in laboratory tests by logging simulated data on the 2 GB SD card for a full battery charge (72 hours). During this time approximately 22 MB of data were recorded. While the GPS and radio telemetry were not continuously active during this time (to increase the battery life), simulated location data was logged to account for the additional data in the file structure. Therefore behavior data could be stored on the same card before the card was full for about 120 days.

Video observations of the tie stall cow (Example 1) were reviewed frame by frame and compared to the recorded piezoelectric sensor signals. The comparison of the video footage with the raw piezo signal showed that both the amplitude and frequency was consistent with the animal's jaw movements (FIG. 5). Video observations were not practical while testing the grazing cow on pasture to avoid disruption of grazing behavior. While jaw movement was recorded and documented by manually following the herd from a distance, spatiotemporal data was collected and compared to satellite imagery.

The recorded data aligned well with the observed data and affords the user an opportunity to track the behavior of grazing cattle very accurately from a distance. The addition of telemetry and telecommand capability allows a single host to access and monitor data collection and system status in real-time to quickly correct issues that arise, such as malfunctioning units.

For the foregoing reasons, it is clear that the method and apparatus described herein provides an innovative animal behavior monitor that may be used to monitor the behavior of various ruminant animals. The current system may be modified in multiple ways and applied in various technological applications. For example, although the current application describes the system as preferably used on cattle, the monitoring apparatus may be modified and used to measure the feeding characteristics of various other animals. The use of the system to monitor other (non-cattle) ruminants should be considered to be within the scope of the disclosure. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A system for monitoring a ruminant animal, the system comprising:
   an elongated film-type piezoelectric sensor abutting and extending along the ruminant animal's lower jaw and buccinator muscles so that the piezoelectric sensor conforms to the animal's lower jaw and buccinator muscles, the film-type piezoelectric sensor generating buccinator and jaw movement data based on movement of the ruminant animal's lower jaw and the buccinator muscles without regard to sounds made by the ruminant animal; and, a computer processor in communication with the film-type piezoelectric sensor, wherein the computer processor processes the buccinator and jaw movement data to record and identify buccinator and jaw movement via at least one pattern detection algorithm associated with at least rumination.

2. The system of claim 1 wherein the computer processor is structured to apply pattern detection algorithm data to the buccinator and jaw movement data to differentiate and categorize the buccinator and jaw movement data so that buccinator and jaw movements are characterized as actions including at least chewing, biting, ruminating, and/or idling.

3. The system of claim 1 wherein, the computer processor analyzes the buccinator and jaw movement data and identifies and communicates at least: a number of bites per (selected time interval); a number of chews per (selected time interval); and overall time spent ruminating or grazing.

4. The system of claim 1 wherein the system comprises two film-type piezoelectric sensors so that a first film-type piezoelectric sensor abuts the animal's jaw on a first side of the animal's head, and a second film-type piezoelectric sensor abuts the animal's jaw on an opposing side of the animal's head.

5. The system of claim 4 wherein the system comprises a data-gathering halter, the film-type piezoelectric sensors being positioned in a pouch in the data-gathering halter.

6. The system of claim 5 wherein the system further comprises a collar-mounted portable electronics module, the film-type piezoelectric sensors in the halter being in communication with the portable electronics module on the collar.

7. The system of claim 1 wherein the film-type piezoelectric sensor is positioned in a data-gathering halter that is in communication with a collar-mounted portable electronics module, the computer processor being positioned in the portable electronics module.

8. The system of claim 7 wherein the portable electronics module also includes a global positioning system (GPS) device.

9. A method of monitoring and analyzing ruminant feeding behavior, the method comprising the steps of:
   (a) supplying the system of claim 1; and,
   (b) applying pattern detection algorithm data to process the buccinator and jaw movement data so that the buccinator and jaw movements can be categorized as at least chewing, biting, ruminating, and/or idling.

10. A method of monitoring a foraging ruminant animal, the method comprising the steps of:
    (a) positioning an elongated film-type piezoelectric sensor to abut and conform to a ruminant animal's jaw and buccinators;
    (b) placing the film-type piezoelectric sensor in electrical communication with a computer processor; and,
    (c) monitoring the ruminant animal's buccinator and jaw movements associated with at least rumination so that when the film-type piezoelectric sensor senses buccinator and jaw movements, buccinator and jaw movement data is communicated to the computer processor and processed without regard to sound data.

11. The method of claim 10 further comprising:
    (d) applying pattern detection algorithm data to the buccinator and jaw movement data to differentiate and categorize the buccinator and jaw movement data so that buccinator and jaw movements are characterized as at least chewing, biting, ruminating, and/or idling.

12. The method of claim 11 further comprising:
    (e) using the computer processor to analyze the buccinator and jaw movement data and determine at least: a number of bites per (selected time interval); a number of chews per (selected time interval); and overall time spent ruminating, grazing, or idling.

* * * * *